United States Patent
Dirksen

(10) Patent No.: US 9,917,535 B2
(45) Date of Patent: Mar. 13, 2018

(54) WAFER AND METHOD OF MANUFACTURING THE SAME

(71) Applicant: KONINKLIJKE PHILIPS N.V., Eindhoven (NL)

(72) Inventor: Peter Dirksen, Eindhoven (NL)

(73) Assignee: KONINKLUJKE PHILIPS N.V., Eindhoven (NL)

( * ) Notice: Subject to any disclaimer, the term of this patent is extended or adjusted under 35 U.S.C. 154(b) by 553 days.

(21) Appl. No.: 14/401,995

(22) PCT Filed: May 30, 2013

(86) PCT No.: PCT/IB2013/054455
§ 371 (c)(1),
(2) Date: Nov. 18, 2014

(87) PCT Pub. No.: WO2013/179247
PCT Pub. Date: Dec. 5, 2013

(65) Prior Publication Data
US 2015/0145372 A1    May 28, 2015

Related U.S. Application Data

(60) Provisional application No. 61/653,675, filed on May 31, 2012.

(51) Int. Cl.
| | |
|---|---|
| H02N 1/06 | (2006.01) |
| H02N 1/00 | (2006.01) |
| B06B 1/02 | (2006.01) |

(52) U.S. Cl.
CPC ............ H02N 1/006 (2013.01); B06B 1/0292 (2013.01)

(58) Field of Classification Search
CPC ......... H02N 1/006; H02N 1/06; B06B 1/0292

USPC .......................................................... 310/300
See application file for complete search history.

(56) References Cited

U.S. PATENT DOCUMENTS

| | | | |
|---|---|---|---|
| 2009/0080292 A1 | 3/2009 | Wagner et al. | |
| 2012/0326556 A1* | 12/2012 | Machida | B06B 1/0292 |
| | | | 310/300 |
| 2015/0145372 A1* | 5/2015 | Dirksen | H02N 1/006 |
| | | | 310/300 |

FOREIGN PATENT DOCUMENTS

| | | |
|---|---|---|
| EP | 2815700 A1 | 12/2014 |
| WO | 2009037655 A2 | 3/2009 |

OTHER PUBLICATIONS

"Fabrication of CMUT Cells with Gold Center Mass for Higher Output Pressure" Yoon et al, 10th International Symposium on Therapeutic Ultrasound, 2010 p. 183-188.

* cited by examiner

*Primary Examiner* — John K Kim

(57) ABSTRACT

The present invention relates to a wafer (100) being subdivided and separable into a plurality of dies. Each die (110) comprises an array of capacitive micro-machined transducer cells (1). Each cell comprises a substrate (10) comprising a first electrode (11), a membrane (13) comprising a second electrode (14), and a cavity (12) between the substrate (10) and the membrane (13). Each cell (1) of at least a part of the dies (110) comprises a compensating plate (15) on the membrane (13), each compensating plate (15) having a configuration for influencing a bow (h) of the membrane (13). The configurations of the compensating plates (13) vary across the wafer (100). The present invention further relates to a method of manufacturing such a wafer and a method of manufacturing such a die.

11 Claims, 15 Drawing Sheets

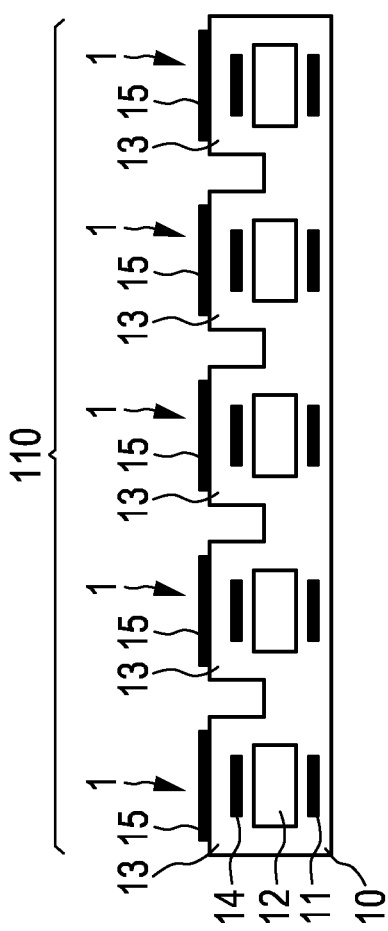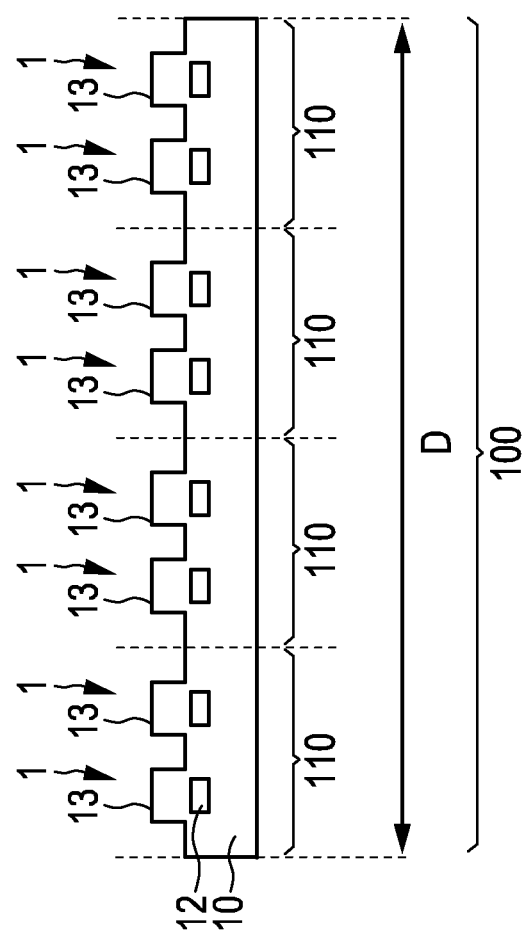

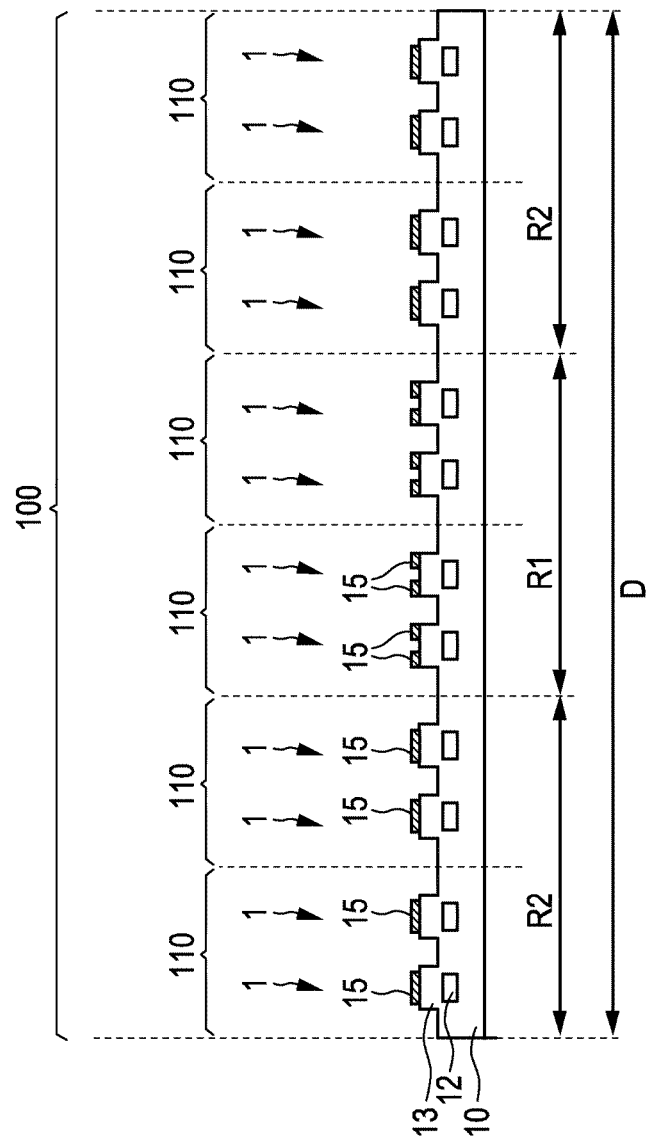

WAFER AND METHOD OF MANUFACTURING THE SAME

This application is the U.S. National Phase application under 35 U.S.C. § 371 of International Application No. PCT/IB2013/054455, filed on May 30, 2013, which claims the benefit of U.S. Provisional Application No. 61/653,675 filed on May 31, 2012. These applications are hereby incorporated by reference herein.

FIELD OF THE INVENTION

The present invention relates to a wafer being subdivided and separable into a plurality of dies, each die comprising an array of capacitive micro-machined transducer cells, in particular capacitive micro-machined ultrasound transducer (CMUT) cells or capacitive micro-machined pressure sensor cells. The present invention further relates to a method of manufacturing such a wafer. The present invention further relates to a method of manufacturing such a die, in particular a die used to form an ultrasound transducer or pressure sensor.

BACKGROUND OF THE INVENTION

The heart of any ultrasound (imaging) system is the ultrasound transducer which converts electrical energy in acoustic energy and back. Traditionally these ultrasound transducers are made from piezoelectric crystals arranged in linear (1-D) transducer arrays, and operating at frequencies up to 10 MHz. However, the trend towards matrix (2-D) transducer arrays and the drive towards miniaturization to integrate ultrasound (imaging) functionality into catheters and guide wires has resulted in the development of so-called capacitive micro-machined ultrasound transducer (CMUT) cells. A CMUT cell comprises a cavity underneath the cell membrane. For receiving ultrasound waves, ultrasound waves cause the cell membrane to move or vibrate and the variation in the capacitance between the electrodes can be detected. Thereby the ultrasound waves are transformed into a corresponding electrical signal. Conversely, an electrical signal applied to the electrodes causes the cell membrane to move or vibrate and thereby transmitting ultrasound waves.

The membrane of the CMUT cell in general consists of several materials or layers, for example a metal electrode embedded in oxides or silicone nitride. Residual stress in these layers causes the cell membrane to bend upwards or downwards, depending on the sign or direction of the stress. Therefore, the cell membrane has a bow or bending of a specific amount and in a direction (upwards or downwards). This bow or bending causes a shift in electrical and acoustical properties of the cell. For example, it influences the collapse voltage and, assuming constant bias voltage, also the centre frequency. Efforts have been made to solve this problem. For example, the paper "Fabrication of CMUT Cells with Gold Center Mass for Higher Output Pressure", Hyo-Seon Yoon et al., 10th International Symposium on Therapeutic Ultrasound (ISTU 2010) AIP Conf. Proc. 1359, 183-188 (2011) discloses a way to improve the output pressure of a single CMUT cell by a modification to the basic CMUT cell structure, namely by adding a gold mass over the center of the top CMUT plate.

Furthermore, there are generally strict specifications on such an ultrasound transducer or CMUT device. Its manufacturing involves quite complex processes. In general, first a larger wafer is manufactured which is then separated into multiple dies each comprising an array of CMUT cells. A particular challenge in this respect is the yield loss in manufacturing when trying to meet the strict specifications for the ultrasound transducers or CMUT devices.

SUMMARY OF THE INVENTION

It is an object of the present invention to provide a wafer with improved and/or cheaper manufacturing, in particular reduced yield loss. It is a further object of the present invention to provide an improved method of manufacturing a wafer and an improved method of manufacturing a die, in particular with reduced yield loss.

In a first aspect of the present invention a wafer being subdivided and separable into a plurality of dies is presented, each die comprising an array of capacitive micro-machined transducer cells, each cell comprising a substrate comprising a first electrode, a membrane comprising a second electrode, and a cavity between the substrate and the membrane, wherein each cell of at least a part of the dies comprises a compensating plate on the membrane, each compensating plate having a configuration for influencing a bow of the membrane, wherein the configurations of the compensating plates vary across the wafer.

In a further aspect of the present invention a method of manufacturing a wafer is presented, the method comprising: providing a wafer being subdivided and separable into a plurality of dies, each die comprising an array of capacitive micro-machined transducer cells, each cell comprising a substrate comprising a first electrode, a membrane comprising a second electrode, and a cavity between the substrate and the membrane, and providing a compensating plate on the membrane of each cell of at least a part of the dies, each compensating plate having a configuration for influencing a bow of the membrane, wherein the configurations of the compensating plates are varied across the wafer.

In a further aspect of the present invention a method of manufacturing a die comprising an array of capacitive micro-machine transducer cells is presented, the method comprising the steps of the method of manufacturing the wafer, and further comprising separating the die from the wafer.

The basic idea of the invention is to vary the configurations of the compensating plates across the wafer, in particular across the diameter of the wafer. Each compensating plate has a configuration for influencing (i.e. reducing or increasing) the bow of the membrane. Thus, each compensating plate provides compensation or a compensating effect for the bow of the membrane. It has been found that the bow of the membrane usually depends on the specific location on the wafer, in particular the location of the membrane or its corresponding die. For example, a centre die or centre dies has or have a different bow compared to an edge die or edge dies. This non-uniformity of the membrane bow is quite unwanted, as the electrical characteristics and acoustical characteristics such as the acoustical output pressure and the centre frequency, depend on the bow and are therefore also non-uniform. As there are strict specifications on the transducers, in particular CMUT devices, the non uniformity translates into yield loss. The present invention solves this problem by varying the configurations of the compensating plates across the wafer, in particular across its diameter. In this way the amount and/or direction of compensation is varied across the wafer. In this way the variation in membrane bow across the wafer is substantially reduced. Thus, there is compensation or compensating effect for the variation in membrane bow across the wafer. Thus, yield loss in manufacturing is reduced. It will be understood that the term diameter in this context in particular refers to the maximum dimension of the wafer across its surface (in a plane orthogonal to its thickness). The term configuration of a compensating plate in particular can refer to the shape, size and/or thickness of the compensating plate. In this way, the shape, size and/or thickness of the compensating plate is used to control the compensation. The shape, size and/or thickness determine the amount of compensation and also the direction (or sign) of compensation (upwards or downwards).

Preferably, the configurations of the compensating plates vary across the wafer such that the membrane bows of the cells are substantially uniform. In other words, the membrane bows of the cells across the wafer are made substantially uniform or the same. The membrane bows do not necessarily need to be zero, but to be substantially uniform across the wafer. It will be understood that the goal is to make the membrane bows of the cells exactly uniform or the same. However, in practice there still might be some minor or neglectable variation in membrane bow. For example, the variation or compensation can be performed in a number of steps, preferably in a small number of steps (e.g. two or three). Thus, in practice some variation in membrane bow might remain, which is however minor or neglectable. The variation of the configurations of the compensating plates across the wafer provides a significant improvement of the variation in membrane bow.

Preferably, the configurations of the compensating plates of the cells of each die are substantially uniform. In other words, the membrane bows of the cells within one die can be assumed to be (substantially) uniform or the same. This assumption is true due to the small size of the die compared to the overall size of the wafer. In practice there still might be some variation in membrane bow within one die, which is however minor or neglectable due to the small size of the die compared to the diameter of the wafer. In other words, the variation in bow within a die may be very small or neglectable. If there is still some minor variation within the die, this is much smaller compared to the variation across the wafer. Preferably, both the cell membrane bows within one die are substantially uniform as well as the bows of the different dies being substantially uniform.

Preferred embodiments of the invention are defined in the dependent claims. It shall be understood that the claimed method of manufacturing a wafer or method of manufacturing a die has similar and/or identical preferred embodiments as the claimed wafer and as defined in the dependent claims.

In a first embodiment the shapes of the compensating plates vary across the wafer. This provides for a particularly easy way of varying the configurations of the compensating plates. In this embodiment the configuration of a compensating plate refers to the shape of the compensating plate. For example, the shapes can vary between a circular shape and a ring shape, in particular for a circular shaped cell or cell membrane. A circular shaped and a ring shaped compensating plate can have opposite compensation effects (e.g. a circular shape can bend the membrane downwards and a ring shaped compensating plate can bend the membrane upwards).

In a second embodiment the sizes of the compensating plates vary across the wafer. This provides for a particularly easy way of varying the configurations of the compensating plates. In this embodiment the configuration of a compensating plate refers to the size of the compensating plate. For example, in manufacturing, the sizes of the compensating plates can easily be varied by using lithography mask with varying sizes and/or shapes. In this way only one additional lithography step for providing the compensating plates is needed.

In a variant of this embodiment each compensating plate has a circular shape with a plate diameter, and wherein the plate diameters vary across the wafer. This (continuous) circular shape or disk provides for a particularly easy and/or effective way of varying the sizes of the compensating plates, in particular for a circular shaped cell or cell membrane. When varying (i.e. increasing or decreasing) the plate diameter, the effect of the compensation is increased.

In another variant of this embodiment each compensating plate has a ring shape with an inner plate diameter, and wherein the inner plate diameters vary across the wafer. This ring shape provides for another particularly easy and/or effective way of varying the sizes of the compensating plates, in particular for a circular shaped cell or cell membrane. When varying (i.e. increasing or decreasing) the inner plate diameter, the effect of the compensation is increased.

In a third embodiment the thicknesses of the compensating plates vary across the wafer. This provides for a particularly effective way of varying the configurations of the compensating plates. In this embodiment the configuration of a compensating plate refers to the thickness of the compensating plate. For example, in manufacturing, the thicknesses of the compensating plates can effectively be varied by applying/depositing at least two material layers on each cell of at least a part of the dies. Multiple additional deposition steps for providing the compensating plates are then needed, but also the compensation effect that can be achieved is very good. Thus, the thicknesses can be varied in multiple steps, in particular multiple (metal) deposition steps. When increasing the thickness of the (metal) compensating plate, the effect of the compensation is increased.

In a variant of this embodiment at least part of the compensating plates comprise more layers than other compensating plates. This provides for a particular effective and/or easy way of varying the thicknesses of the compensating plates. For example, in manufacturing, the thicknesses of the compensating plates can effectively be varied by applying/depositing a first layer and applying/depositing at least a second layer such that at least part of the compensating plates comprise more layers than other compensating plates.

In another embodiment the configurations of the compensating plates vary stepwise from a first region of the wafer to a second region of the wafer. In this way only a limited number of variations or steps are needed to provide for a sufficient compensation. In particular, the first region and second region each comprises multiple dies. For example, the configurations of the compensating plates may vary stepwise from the first region to the second region as well as from the second region to a third region. For example, three or less regions may be sufficient to provide for a sufficient compensation.

In another embodiment the compensation plate is made of metal, in particular Aluminium. A metal enables to provide the compensating plate in a particularly easy manner. In particular Aluminium provides for a particularly predictable manufacturing process. Even though Aluminium may be preferred, any other material may be used as long as the stress of the compensating plate is well controlled.

In a further embodiment each cell comprises a protective coating over the compensating plate. This provides for protection of the compensating plate against its environment, e.g. against corrosion. This protective coating or passivation layer can be thin, for example below 200 nm or below 100 nm. For example, the protective coating can be made of silicone nitride (Si$_3$N$_4$).

In another embodiment the method comprises the step of determining the membrane bow of the cells of each die before providing the compensating plates. In this way the variation pattern or distribution of the membrane bows across the wafers can be determined. The configurations of the compensating plates can then be varied according to this variation pattern or distribution. In particular, this determination step can be performed only once for a first wafer when starting the manufacturing of wafers. The variation in the membrane bows can then be assumed to be the same for the subsequent wafers. Of course, it is also possible to perform this determination step before manufacturing each single wafer. This will provide for a more accurate compensation at the cost of a more time-consuming manufacturing. For example, the determination step can comprise determining if the amount of compensation across the wafer is sufficient, and adjusting the amount of compensation if it is determined that the amount of compensation across the wafer is not sufficient. Determining if the amount of compensation across the wafer is sufficient can for example be performed by an electrical measurement, for example the measurement of the collapse voltage.

In a further embodiment the step of providing the compensating plates comprises using a lithography mask with varying sizes and/or shapes. In this way the sizes and/or shapes of the compensating plates can be varied across the wafer. This provides for a particularly easy way of varying the configurations of the compensating plates. Only one additional lithography step for providing the compensating plates is needed. In other words, the size and/or shape of the compensating plate is applied via lithography, in particular by imaging and patterning of a lithography mask in photo resist.

In another embodiment the step of providing the compensating plates comprises applying a first layer and applying at least a second layer such that at least part of the compensating plates comprise more layers than other compensating plates. In this way the thicknesses of the compensating plates can be varied across the wafer. This provides for a particularly effective way of varying the configurations of the compensating plates. In other words, the thicknesses of the compensating plates can effectively be varied by applying/depositing at least two material layers on each cell of at least a part of the dies. Multiple additional deposition steps for providing the compensating plates are then needed, but also the compensation effect that can be achieved is very good. The thickness of the compensating plate is a deposition parameter. This deposition parameter can be chosen, in particular in such a way that the membrane bows of the cells are made substantially uniform.

BRIEF DESCRIPTION OF THE DRAWINGS

These and other aspects of the invention will be apparent from and elucidated with reference to the embodiment(s) described hereinafter. In the following drawings

FIG. 5 shows a schematic cross section of a die having an array of CMUT cells;

FIG. 7 shows a schematic cross section of a wafer being subdivided and separable into a plurality of dies;

FIG. 8 shows a schematic cross section of a wafer according to a first embodiment;

DETAILED DESCRIPTION OF THE INVENTION

Figure 1:
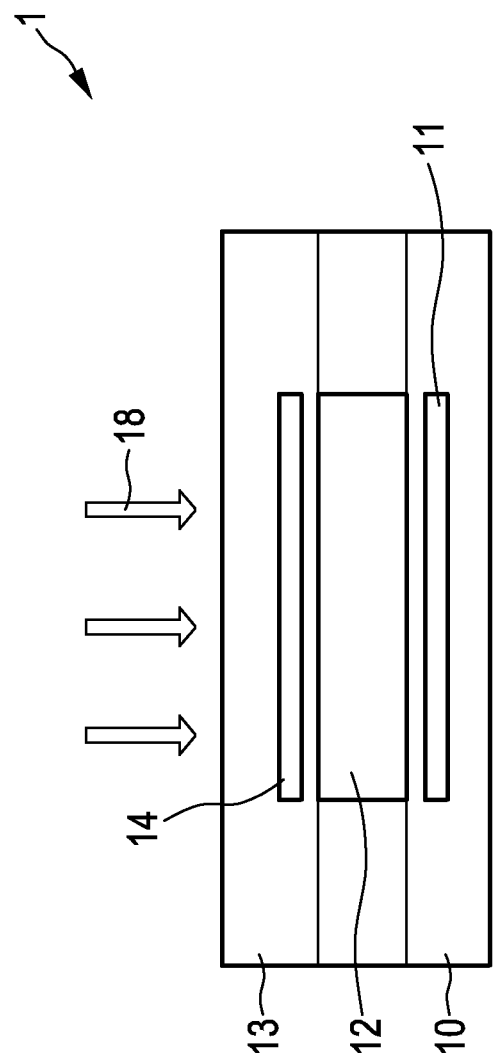
FIG. 1 shows a schematic diagram of an exemplary capacitive micro-machined transducer cell, in particular a CMUT cell

FIG. 1 shows a schematic diagram of an exemplary capacitive micro-machined transducer cell 1, in particular a CMUT cell. The cell 1 comprises a substrate 10 (e.g. made of silicone) comprising a first electrode 11, also known as bottom electrode. In this example shown in FIG. 1 the first electrode 11 is embedded in the substrate or substrate base layer 10. However, it will be understood that it may also be applied on top of the substrate or substrate base layer. The cell 1 further comprises a membrane 13 (e.g. made of silicone nitride) comprising a second electrode 14, also known as top electrode. In this example shown in FIG. 1 the second electrode 14 is embedded in the membrane or membrane base layer 13. However, it will be understood that it may also be applied on top of the membrane or membrane base layer. The cell 1 further comprises a cavity 12 between the substrate 10 and the membrane 13. This cavity 12 is normally kept at low pressure close to vacuum and provides a space between the substrate 10 and a membrane 13. In such a CMUT cell, for receiving ultrasound waves, the ultrasound waves cause the cell membrane 13 to move or vibrate and the variation in the capacitance between the electrodes 11, 13 can be detected. Thereby the ultrasound waves are transformed into a corresponding electrical signal. Conversely, an electrical signal applied to the electrodes 11, 13 can cause the cell membrane 13 to move or vibrate and thereby transmitting ultrasound waves.

From a technology point of view, the pre-collapsed capacitive micro-machined transducer cell (in particular cMUT) can in principle be manufactured in any conventional way, which is for example described in detail in WO 2010/032156 A2, which is incorporated by reference herein.

Even though FIG. 1 has been explained—and the remaining part of the description will be explained—with respect to a CMUT cell for transmitting and/or receiving ultrasound waves, it will be understood that the capacitive micromachined transducer cell can as well be used for another purpose, for example as a pressure sensor. In a pressure sensor cell, the membrane 13 experiences a pressure which causes the membrane 13 to flex or bend. The change in position of the membrane 13 causes a change in distance between the first and second electrodes 11 and 14, thereby changing a capacitance established between them. This change in capacitance is detected and converted into a pressure measurement change. It should be noted that the drawing of FIG. 1 is just exemplary and that the cell 1 may comprise other features or layers or layer stacks, as necessary for the processing and electrical operation of the device.

Figure 3:
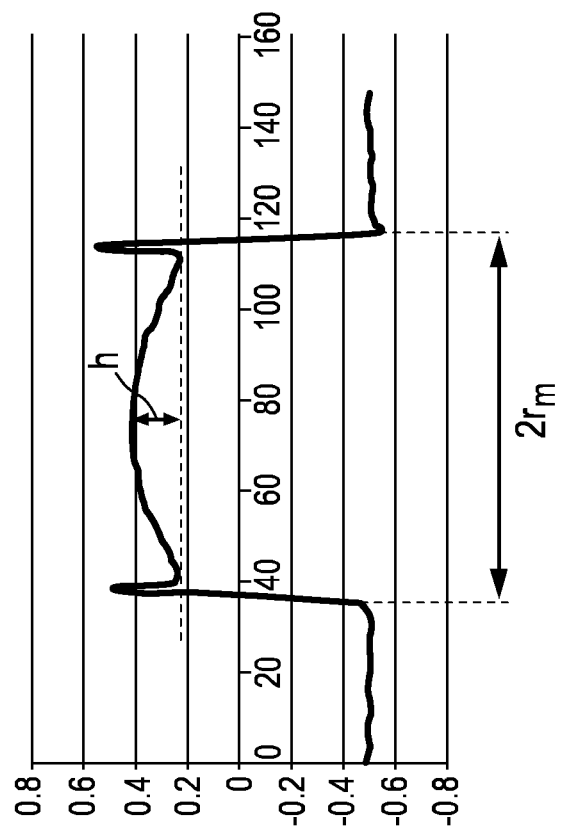
FIG. 3 shows a cross-sectional profile of a CMUT cell of FIG. 2.
Figure 2:
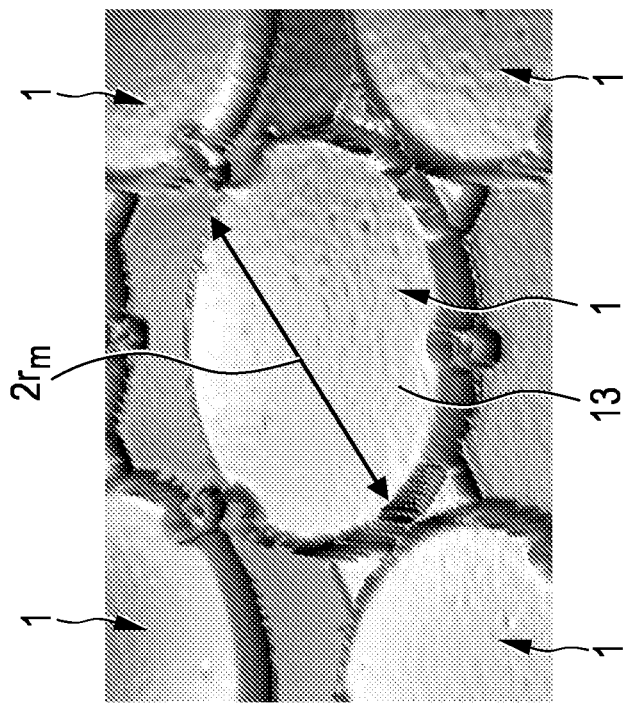
FIG. 2 shows an exemplary three-dimensional top view on an array of CMUT cells.

FIG. 2 shows an exemplary three-dimensional top view on an array of CMUT cells 1, in particular cells as explained with reference to FIG. 1. The array of CMUT cells 1 forms a matrix (2-D) transducer array. In this example each CMUT cell 1 has a circular shape with a diameter $2r_m$ of the cell 1 or its membrane 13. FIG. 3 shows a cross-sectional profile of a CMUT cell of FIG. 2. As can be seen in FIG. 3, the membrane 13 of the cell 1 has a bending or bow h. The bow h is sometimes also referred to as deflection, displacement or deformation of the membrane. The bow h has in general a specific amount and is of a specific direction, which is upwards or downwards. In this example of FIG. 3, the bow h has an amount of about 200 nm and an upwards direction. The bow h causes a shift in electrical and acoustical properties of the cell 1. The bow h influences the collapse voltage (e.g. up to 25%) and, assuming constant bias voltage, also the centre frequency (e.g. of about 1-2 MHz).

Figure 4:
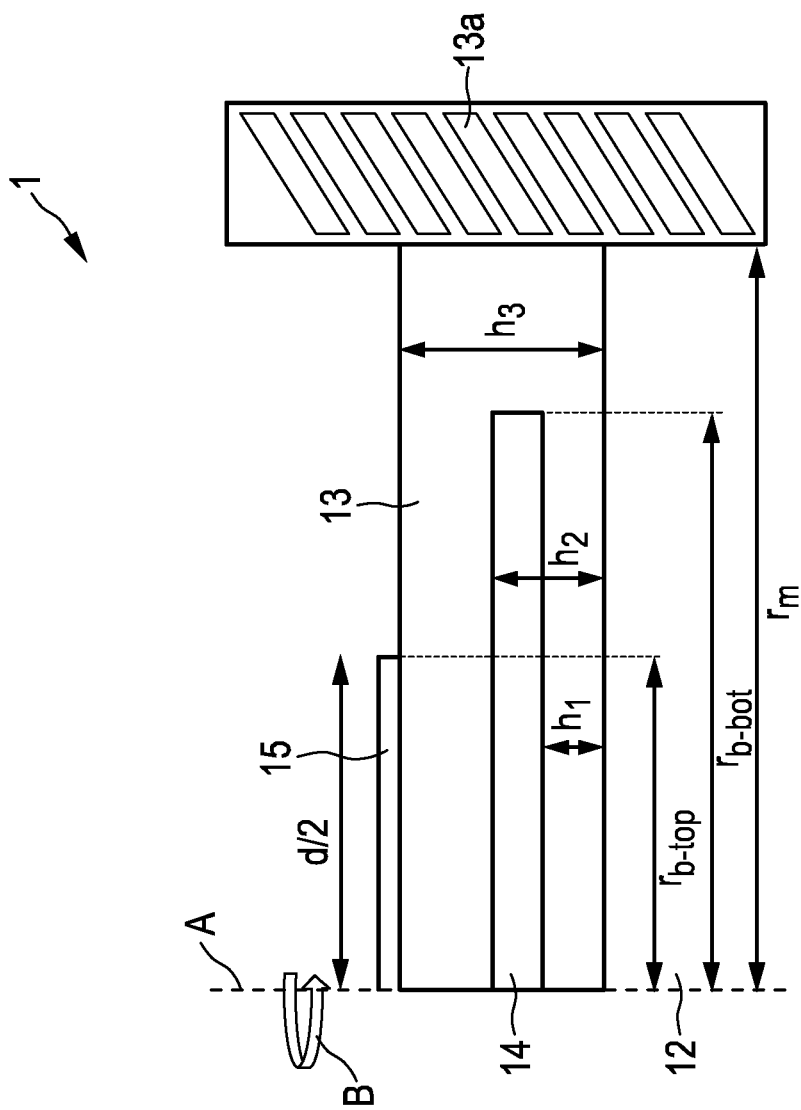
FIG. 4 shows a schematic cross section of an exemplary CMUT cell having a compensating plate.

In order to influence the bow, a compensating plate 15 on (e.g. on top of) the membrane or membrane base layer 13 can be used. FIG. 4 shows a schematic cross section of an exemplary CMUT cell 1, in particular as explained with reference to FIGS. 1 to 3, having such a compensating plate 15. Arrow B in FIG. 4 illustrates that this particular CMUT cell 1 has circular symmetry around the central (lateral) axis A of the cell or membrane (orthogonal to the surfaces of the membrane). The sections of the CMUT cell shown in FIG. 4 concentrate on the membrane 13. An anchor point 13a for the membrane 13 is also shown. The compensating plate 15 is arranged on the membrane or membrane base layer 13. It will be understood that the compensating plate 15 also vibrates or moves when receiving and/or transmitting ultrasound waves, as explained with reference to FIG. 1. Thus the compensating plate 15 can be assumed to be also part of the membrane 13, in particular being arranged on a membrane base layer. In the example shown in FIG. 4, the compensating plate 15 is arranged on an outer surface of membrane or membrane base layer 13 opposite to the cavity 12.

In general, stress in the membrane 13 may cause the membrane bow. In one example, a temperature change or thermally induced stress may be the root cause of membrane bow (or also called deflection). It generally stems from the design and characteristics of the materials making up the membrane 13. The second (top) electrode 14 is made from an electrically conductive material which is different from the material of the membrane or membrane base layer 13 itself. Under the influence of temperature change, the two materials expand or contract at different rates and with different expansion characteristics. This creates a thermally induced stress and momentum within the membrane. This thermally induced stress and momentum may trigger movement in the membrane, thereby stimulating a change in capacitance. By applying the compensating plate 15 on the membrane 13, the bow or deflection of the membrane can be influenced.

The bow or deflection h of the membrane 13 can be modelled according to:

$$h = h_{top} + h_{bot},$$

$$h_{top} = \frac{M}{2 \cdot D} r_{b-top}^2 \log\left(\frac{r_m}{r_{b-top}}\right)$$

and $$h_{bot} = \frac{M}{2 \cdot D} r_{b-bot}^2 \log\left(\frac{r_m}{r_{b-bot}}\right)$$

with $$D = \frac{E \cdot h_3^3}{12 \cdot (1 - v^2)},$$

$$M = S \cdot ((h_2 - 0.5h_3)^2 - (h_1 - 0.5h_3)^2)$$

$$S = (\alpha_1 \cdot E_1 - \alpha_2 \cdot E_2) \cdot \Delta T$$

where h is the deflection of the membrane towards the substrate at a centre point of the cavity, in particular the central (lateral) axis A, due to stress (e.g. thermally induced stress), M is the momentum of the membrane due to stress (e.g. thermally induced stress), D is the flexural rigidity of the membrane 13, $r_m$ is a radius of the membrane (as defined from the centre point of the cavity), $r_{b-bot}$ is a radius of the second (top) electrode 14 (as defined from the centre point of the cavity), $r_{b-top}$ is a radius of the compensating plate 15 (as defined from the centre point of the cavity), $h_1$, $h_2$ and $h_3$ are the distances of a first side of the second (top) electrode 14, a second side of the second (top) electrode 14 and the thickness of the membrane 13, respectively (as measured from the inner surface of the membrane forming the side of the cavity), $v$ is the Poisson ratio, S is the thermal stress in the membrane, E is Young's modulus for the material of the membrane 13, $E_1$ and $E_2$ relating to the second (top) electrode 14 and the membrane 13, respectively, $\Delta T$ is a temperature change, and $\alpha$ is a expansion coefficient of a material, $\alpha_1$ and $\alpha_2$ relating to the second (top) electrode 14 and the membrane 13, respectively.

It will be understood that thermally induced stress is just one example, but there may be other or additional reasons that result in stress in the membrane. Therefore, in the above formula, S may generally or also be referred to as the "stress value". Furthermore, it will be understood that the above formula for the membrane bow or deflection h is derived for the particular membrane construction indicated in FIG. 4, which is a simplification. Thus, it will be understood that this is merely an illustration highlighting some of the main effects.

Figure 4A:
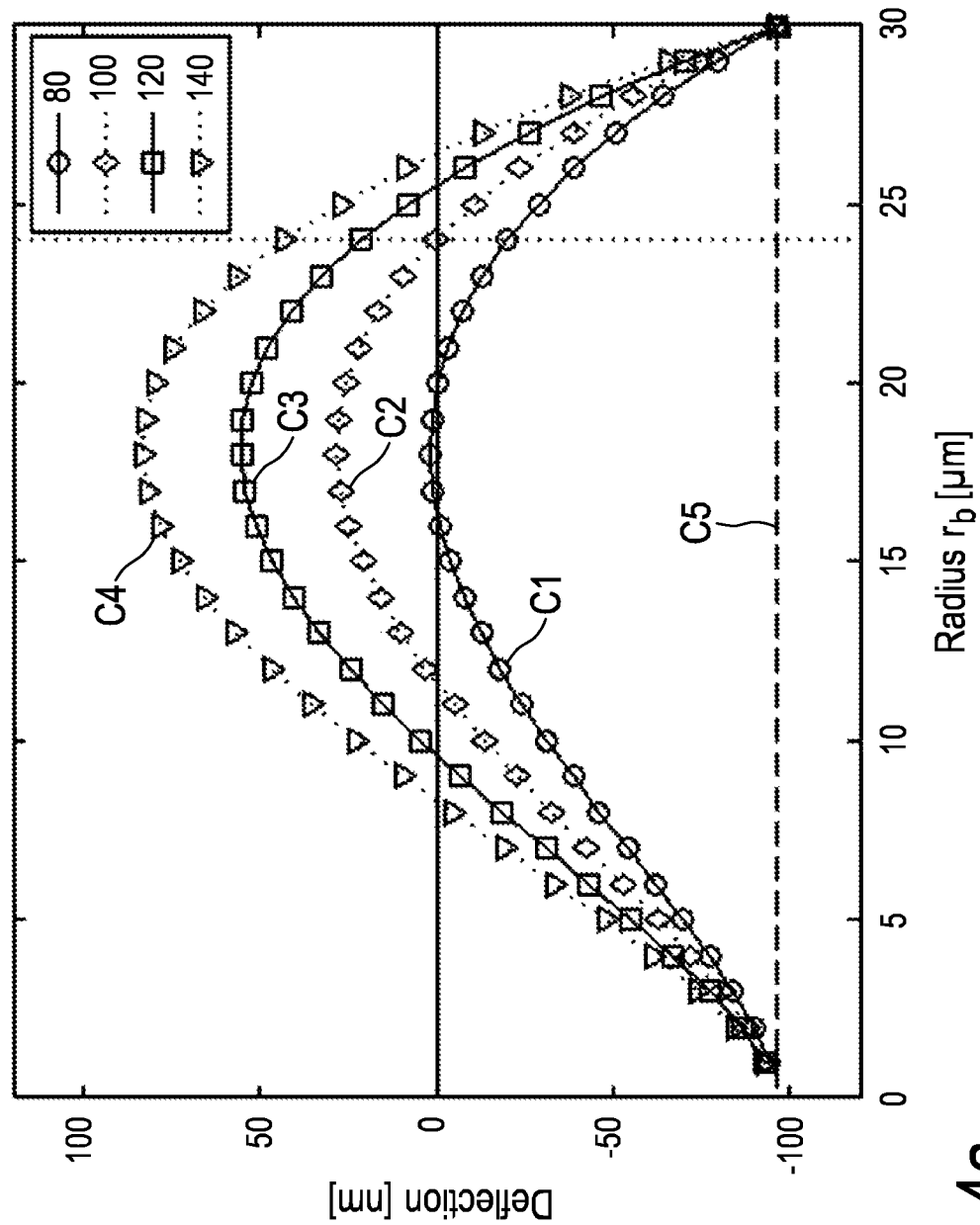
FIG. 4a shows an exemplary diagram of bow of the membrane as a function of the radius of the compensating plate for four different thicknesses of the compensating plate.

The size (or diameter d, wherein only the radius d/2 or $r_{b-top}$ is shown in FIG. 4) and/or thickness of the compensating plate 15 can be varied to produce different compensation effects. This will be explained in more detail with reference to FIG. 4a. FIG. 4a shows an exemplary diagram of bow or deflection of the membrane 13 as a function of the radius $r_b$ of the compensating plate 15 for four different thicknesses of the compensating plate. For the diagram of FIG. 4a, a circular shaped compensating plate 15 in the centre of the membrane, as explained with reference to FIG. 4, was used. The compensating plate was made of Aluminium. The membrane radius $r_m$ was 30 µm. A first curve C1 indicates a compensating plate thickness of 80 nm (indicated by circles), a second curve C2 indicates a compensating plate thickness of 100 nm (indicated by rhombs), a third curve C3 indicates a compensating plate thickness of 120 nm (indicated by squares), and a fourth curve C4 indicates a compensating plate thickness of 140 nm (indicated by triangles). A line C5 indicates a compensating plate thickness of zero, thus no compensating plate being present. It is now possible to chose the compensating plate thickness and size such that a specific bow or deflection is achieved, for example a bow or deflection of zero. For a specific example of a compensating plate radius $r_b$ of 24 µm, as indicated by a vertical dotted line in FIG. 4a, the compensating plate thickness should be about 100 nm in order to achieve zero bow or deflection. Or the other way round, for a compensating plate thickness of 100 nm, the compensating plate radius $r_b$ should be about 24 µm in order to achieve zero bow or deflection. Thus, in general, for a given shape of the compensating plate, the size and thickness of the compensating 15 plate are used to influence the bow h of the membrane 13.

FIG. 5 shows a schematic cross section of a die 110 having an array of CMUT cells 1, in particular a CMUT cell as explained with reference to FIG. 1 to FIG. 4. The CMUT cells 1 are arranged in an array one next to the other. Each cell membrane 13 comprises a compensating plate 15. The compensation plate 15 can for example be made of metal, in particular Aluminium which provides for a particularly predictable manufacturing process. Even though Aluminium may be preferred, any other material may be used as long as the stress of the compensating plate 15 is well controlled or compensated. Furthermore, each cell 1 may optionally comprise a protective coating over the compensating plate 15. The protective coating or passivation layer may be thin, for example below 200 nm or below 100 nm. For example, the protective coating can be made of silicone nitride ($Si_3N_4$). A die 110, as for example shown in FIG. 5, after being separated from a wafer 100, may then be used to form a transducer, in particular an ultrasound transducer or pressure sensor. For this, external connections to a possible associated ASIC or any other connections to the outside environment may be provided. For example, the die 110 may be placed on top of an ASIC.

A wafer used for manufacturing such a transducer device comprises a plurality of such dies 110, in particular as explained with reference to FIG. 5. Thus, a wafer is subdivided and separable into a plurality of dies 110. As a wafer generally comprises a large number of dies 110, the size of a die 110 is very small compared to the overall size or diameter of the wafer. For example, the size of a die can be between about 1/10 to 1/50 of the overall size or diameter of the wafer. In other words, a wafer can for example have between at least 10 to 50 dies. Just to give a specific non-limiting example, the size of a die can be only between 5 to 10 mm while the wafer size or diameter can for example be 150 to 200 mm. In particular, the wafer size can be a fixed value, such as for example 150 mm (also referred to as 6 inch), 200 mm (also referred to as 8 inch), or 300 mm (also referred to as 12 inch). It will be understood that the wafer can also have another fixed size, such as for example 100 mm (also referred to as 4 inch).

Figure 6:
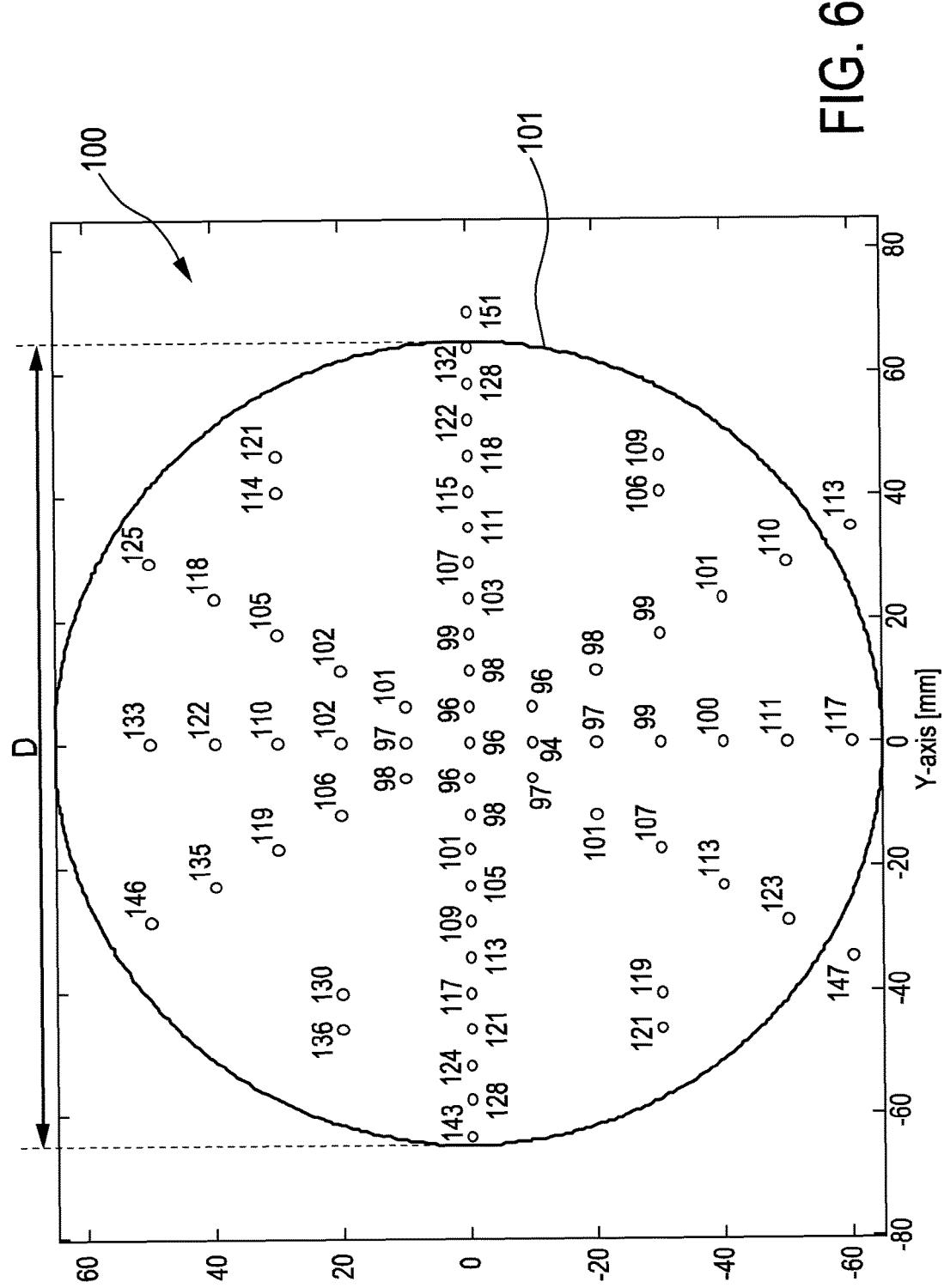
FIG. 6 shows a schematic diagram of an exemplary variation of the collapse voltage across a wafer without variation in the configurations of compensating plates.

It has been found that the bow h of a cell membrane 13 usually depends on the specific location on the wafer, in particular the location of the membrane 13 or its corresponding die. A centre die has a different bow h compared to an edge die. This will further be explained with reference to FIG. 6. FIG. 6 shows a schematic diagram of an exemplary variation of the collapse voltage Vc across a wafer 100 without variation in the configurations of the compensating plates. The big circle in FIG. 6 represents the rim or edge 101 of the wafer 100. The wafer 100 has a diameter D. The diameter D is defined by the rim or edge 101 of the wafer 100. Even though FIG. 6 shows a circular shaped wafer 100, it will be understood that the term diameter is not limiting to a circular wafer shape, but in general refers to the maximum dimension of the wafer across its surface (in a plane orthogonal to its thickness). Each of the small circles in FIG. 6 represents one of the dies of the wafer. With each small circle representing a die, a number is associated in FIG. 6. Each number indicates or represents the collapse voltage Vc of the corresponding die. Within each die, the membrane bow is assumed to be (substantially) uniform. As the collapse voltage Vc is related to the bow h, the collapse voltage Vc is an indication of the bow h. As can be seen in FIG. 6, in the centre of the wafer 100, where the centre dies are, the collapse voltage is about 96 V and near the edge or rim of the wafer 100, where the edge dies are, it is about 130 V or 140 V. As FIG. 6 shows, the membrane bow causes a variation in collapse voltage, ranging from about 95 V in the centre of the wafer and increasing to about 130 V or 140 V near the edge 102 of the wafer 100. As can be seen in FIG. 6, the bow varies across the wafer 100 and increases towards the edge 101 of the wafer 100. The radial pattern shown in FIG. 6 is characteristic for the specific deposition tool(s) used. Thus, it will be understood that the pattern in FIG. 6 is simply exemplary. It may be assumed that the variation or pattern reproduces from wafer to wafer in manufacturing.

This non-uniformity of the membrane bow, as for example shown in FIG. 6, is quite unwanted, as the electrical characteristics and acoustical characteristics, such as the acoustical output pressure and the centre frequency, depend on the bow h and are therefore also non-uniform. In order to solve this problem the configurations of the compensating plates are varied across the wafer 100, more specifically across its diameter D, which will be explained in more detail in the following.

FIG. 7 shows a schematic cross section of a wafer 100 being subdivided and separable into a plurality of dies 110. Each die 110 comprises an array of capacitive micromachined transducer cells 1, in particular CMUT cells, for example as explained with reference to FIG. 5. It will be understood that for simplification purposes only two cells are shown for each die in FIG. 5 as well as the following Figures, and that each die can in principle comprise any suitable number of cells. As for example explained with reference to FIG. 1, each cell 1 comprises a substrate 10 comprising a first electrode 11 (not shown in FIG. 7 for simplification purposes), a membrane 13 comprising a second electrode 14 (not shown in FIG. 7 for simplification purposes), and a cavity 12 between the substrate 10 and the membrane 13. Each cell 1 of at least a part of the dies 12 comprises a compensating plate 15 (not shown in FIG. 7 for simplification purposes) on the membrane 13. Each compensating plate has a configuration for influencing a bow h of the membrane 13, as for example explained with reference to FIG. 4 or FIG. 5. The configurations of the compensating plates 15 vary across a diameter D of the wafer. In this way the amount of compensation is varied across the wafer. The configurations of the compensating plates 15 vary across the diameter D of the wafer such that the membrane bows of the cells 1 are made substantially uniform. The membrane bows do not necessarily need to be zero, but to be substantially uniform across the wafer. Furthermore, the configurations of the compensating plates 15 of the cells of each die 110 are assumed to be substantially uniform. This assumption is true due to the small size of the die 110 compared to the overall size D of the wafer 100.

With reference to FIG. 4a it has been explained that for a given shape of a compensating plate, the size and thickness of the compensating plate can be used to influence the bow h of the membrane. As mentioned above, the bow of a membrane of a cell does not necessarily need to be made zero, but the membrane bows are made to be substantially uniform across the wafer by varying the configurations of the compensating plates, for example by choosing the size and thickness for a given shape, as explained with reference to FIG. 4a. More generally, it can be said that the shape, size and/or thickness of the compensating plate 15 can be varied to produce different compensation effects. Thus, the shape, size and/or thickness of the compensating plate 15 is used to control the compensation. The shape, size and/or thickness determine the amount of compensation and also the direction (or sign) of compensation (upwards or downwards). Thus, the configuration of a compensating plate can refer to the shape, size and/or thickness of the compensating plates, in particular to the size (or length or diameter) and/or thickness of the compensating plate (for a given shape). For example, a common material for the compensating plates can be used, as the manufacturing with multiple materials would be more complicated. However, the configuration of the compensating plate may also refer to the material of the compensating plate. In particular, the material defines the Young modulus E, Poisson ratio $\upsilon$ and thermal expansion coefficient $\alpha$. These properties also influence the stress or membrane bow, as explained in connection with the formulas above.

Now, the corresponding method of manufacturing such a wafer 100 will be explained. A method of manufacturing such a die 110 additionally comprises the (final) step of separating the die 110 from the wafer 100. The method of manufacturing such a wafer comprises first the step providing a wafer 100 being subdivided and separable into a plurality of dies 110, in particular a wafer with non-uniform membrane bows, such as for example shown in FIG. 6. The method further comprises the step of providing a compensating plate 15 on the membrane 13 of each cell 1 of at least a part of the dies 110, each compensating plate 15 having a configuration for influencing a bow h of the membrane 13, wherein the configurations of the compensating plates 15 are varied across the diameter D of the wafer 100. Optionally, the method may comprise the step of determining the membrane bow h of the cells 1 of each die 110 before providing the compensating plates 15. In this way the variation pattern or distribution of the membrane bows across the wafers can be determined, and then the configurations of the compensating plates 15 can be varied according to this variation pattern or distribution. This determination step can be done only once for a first wafer when starting the manufacturing of wafers, when the variation in the membrane bows can then be assumed to be the same for the subsequent wafers 100. Of course, it is also possible to perform this determination step before manufacturing each single wafer. This will provide for a more accurate compensation at the cost of a more time-consuming manufacturing.

For example, the determination step can comprise determining if the amount of compensation across the wafer is sufficient, and adjusting the amount of compensation if it is determined that the amount of compensation across the wafer is not sufficient. Determining if the amount of compensation across the wafer is sufficient can for example be performed by an electrical measurement, for example the measurement of the collapse voltage. This provides a verification or checking if the amount of compensation across the wafer is sufficient or good, and an adjustment if improvements are needed.

With reference to FIG. 8 to FIG. 14, various examples of variations of the configurations of the compensating plates will now be explained. Even though each of FIG. 8 to FIG. 14 shows a different embodiment, it will be understood that the features of the different embodiments can be combined or exchanged in any suitable manner.

FIG. 8 shows a schematic cross section of a wafer 100 according to a first embodiment. In this first embodiment of FIG. 8, the shapes of the compensating plates 15 vary across the diameter D of the wafer. Thus, the term configuration of a compensating plate in this embodiment refers to the shape of the compensating plate 15. The compensating plates 15 of a die 110 in the centre of the wafer (region R1) have a different shape than the compensating plates 15 of a die 110 at the edge of the wafer (region R2). In this specific embodiment shown in FIG. 8, the centre dies (region 1) have a ring shape and the edge dies have a (continuous) circular shape, or also called disk. Thus, the shapes vary between a circular shape and a ring shape.

Figure 8B:
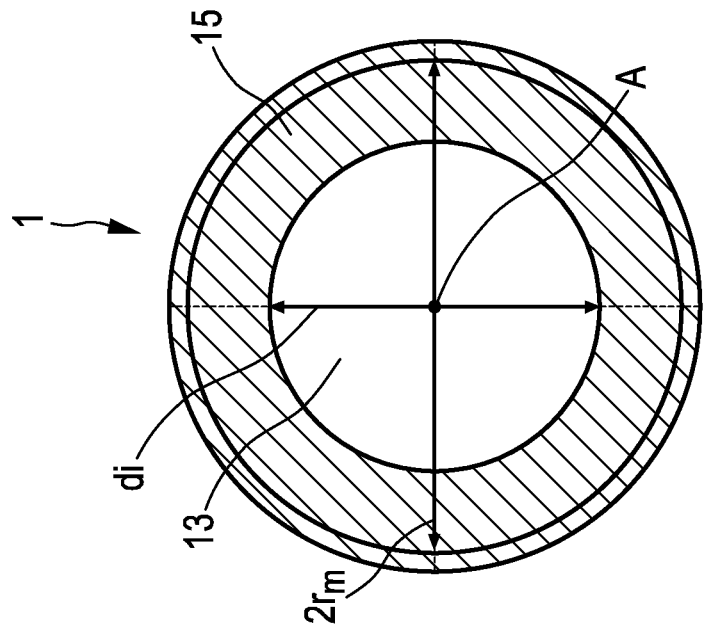
FIG. 8b shows an exemplary top view of a ring shaped compensating plate on a membrane.
Figure 8A:
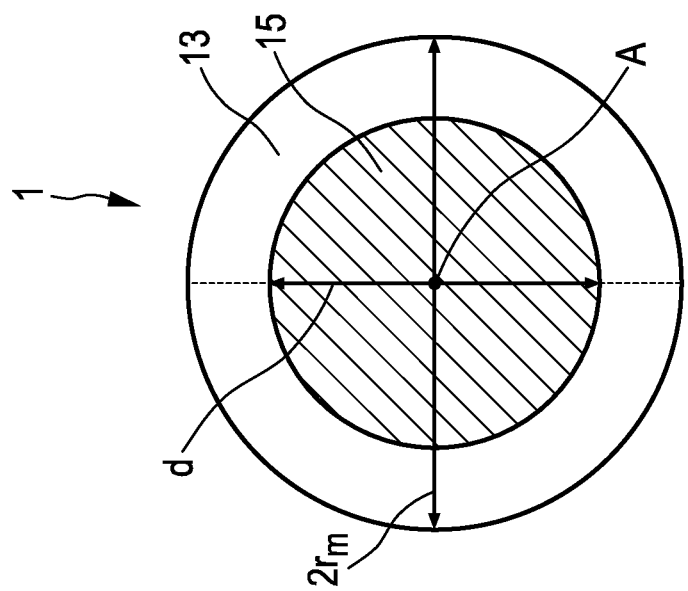
FIG. 8a shows an exemplary top view of a circular shaped compensating plate on a membrane.

FIG. 8a shows an exemplary top view of a circular shaped compensating plate on the membrane, and FIG. 8b shows an exemplary top view of a ring shaped compensating plate on the membrane. The (continuous) circular shaped compensating plate is positioned centered around the central axis A of the membrane. In this way an upwards bow of the membrane can be reduced. Also, the ring shaped compensating plate is positioned centred around the central axis A of the membrane. In this way a downwards bow of the membrane can be reduced. Thus, in this case the shape of the compensating plate influences the direction of bowing.

Figure 9:
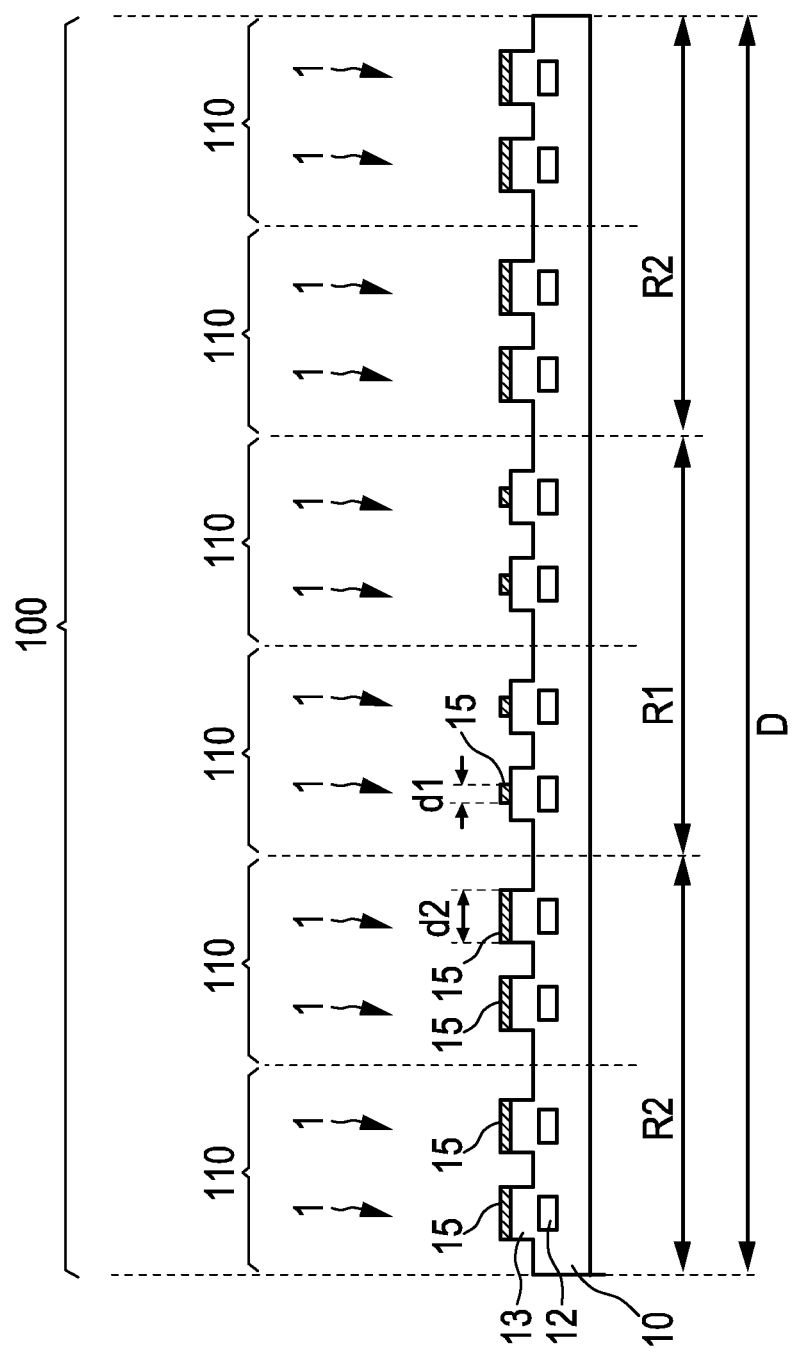
FIG. 9 shows a schematic cross section of a wafer according to a second embodiment.

FIG. 9 shows a schematic cross section of a wafer 100 according to a second embodiment. In this second embodiment of FIG. 9, the sizes d1, d2 of the compensating plates 15 vary across the diameter D of the wafer. Thus, the term configuration of a compensating plate in this embodiment refers to the size of the compensating plate 15. The compensating plates 15 of a die 110 in the centre of the wafer (region R1) have a first size d1 and the compensating plates 15 of a die 110 at the edge of the wafer (region R2) have a second size d2, wherein the first size d1 is smaller than the second size d2. Thus, the sizes d1, d2 vary across the diameter D of the wafer 100. When increasing the size of the compensating plate 15 from the centre (first region 1) to the edge (second region R2) of the wafer, the membrane bow is reduced. For example, if each compensating plate 15 in FIG. 9 has a (continuous) circular shape, the size d1, d2 corresponds to the plate diameter. However, it will be understood that in general the cell 1 can have any other suitable shape. For example, the compensating plate can have a ring shape which will be explained in more detail with reference to FIG. 11. In manufacturing, the sizes of the compensating plates 15 can easily be varied by using a lithography mask with varying sizes and/or shapes, in particular by imaging and patterning of the lithography mask in photo resist. Only one additional lithography step for providing the compensating plates is then needed. For example, for lithography either a stepper or a contact printer can be used. A stepper is a well known production tool that exposes one die at the time, at a high resolution. A stepper uses typically a 4× or 5× reduction. A contact printer uses a 1× reduction and exposes the entire wafer in one exposure. This would allow more variation in the amount of compensation.

Figure 10:
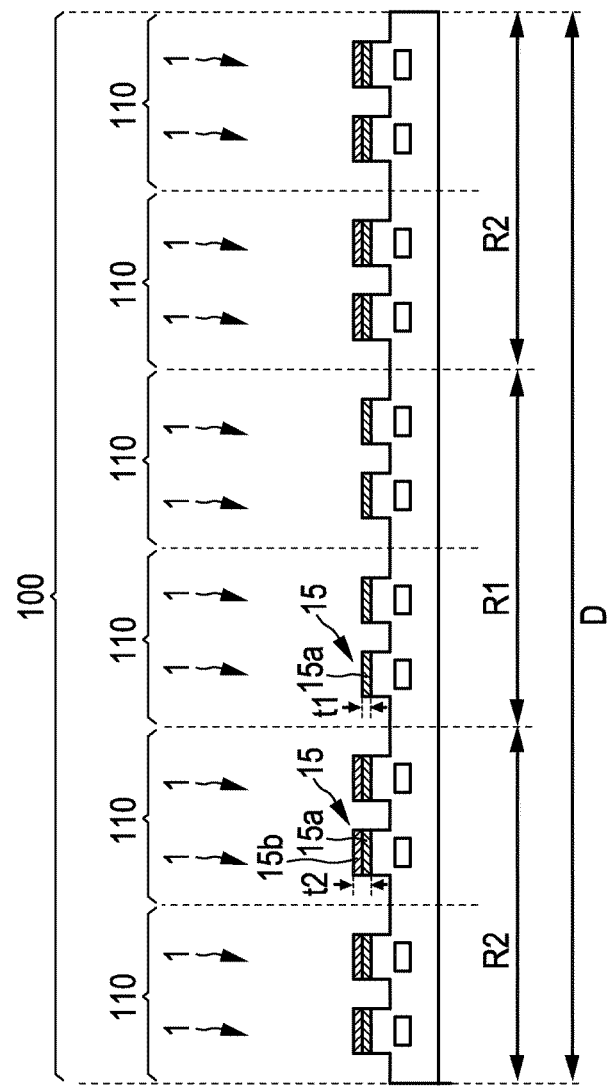
FIG. 10 shows a schematic cross section of a wafer according to a third embodiment.

FIG. 10 shows a schematic cross section of a wafer according to a third embodiment. In this third embodiment of FIG. 10, the thicknesses t1, t2 of the compensating plates 15 vary across the diameter D of the wafer 100. Thus, the term configuration of a compensating plate in this embodiment refers to the thickness of the compensating plate 15. The compensating plates 15 of a die in the centre of the wafer (region R1) have a first thickness t1 and the compensating plates of a die at the edge of the wafer (region R2) have a second thickness t2, wherein the first thickness t1 is smaller than the second thickness t2. In the embodiment of FIG. 10, the compensation plates 15 of the centre dies have only a single layer 15a, while the compensating plates 15 of the edge dies have a first layer 15a and a second layer 15b. Thus, in this embodiment part of the compensating plates 15, here the compensating plates of the edge dies (region R2), comprise more layers than other compensating plates 15, in this case the compensating plates 15 of the centre dies (region R1). Even though a single layer compared to two layers is shown in FIG. 10, it will be understood that any other suitable number of layers can be used as long as there is a variation in the thickness. A thicker (e.g. metal) compensating plate increases the effect of the compensation. In other words, when increasing the thickness, the effect of compensation is increased. In manufacturing, the thicknesses t1, t2 of the compensating plates 15 can effectively be varied by applying/depositing (e.g. by metal deposition) at least two material layers on each cell of at least a part of the dies (e.g. edge dies in region R2 in FIG. 10). Thus, a first layer 15a and a second layer 15b can be deposited such that part of the compensating plates 15 (e.g. compensating plates of the edge dies in region R2 in FIG. 10) comprise more layers than other compensating plates (e.g. compensating plates of the centre dies in region R1 in FIG. 10). Multiple additional deposition steps for providing the compensating plates are then needed, but also the compensation effect that can be achieved is very good. The thickness t of the compensating plate 15 is thus a deposition parameter. This deposition parameter can be chosen in such a way that the membrane bows of the cells are made substantially uniform.

Figure 11:
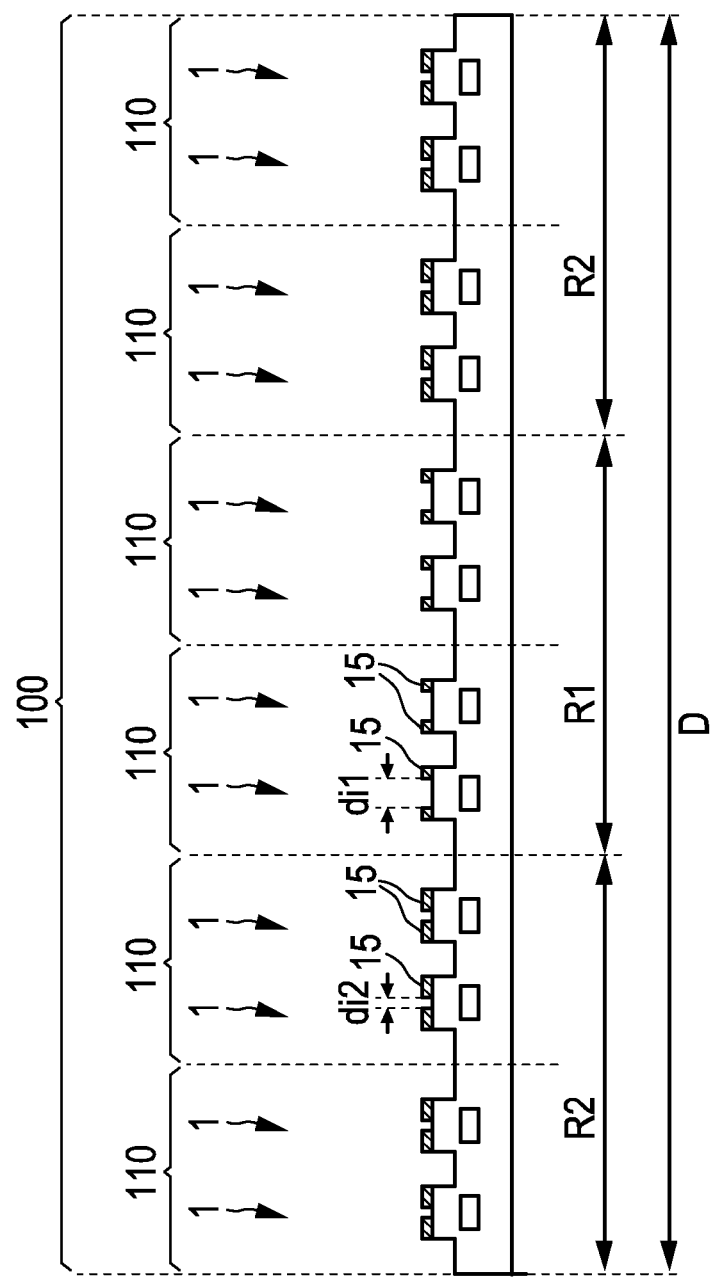
FIG. 11 shows a schematic cross section of a wafer according to a fourth embodiment.
Figure 12:
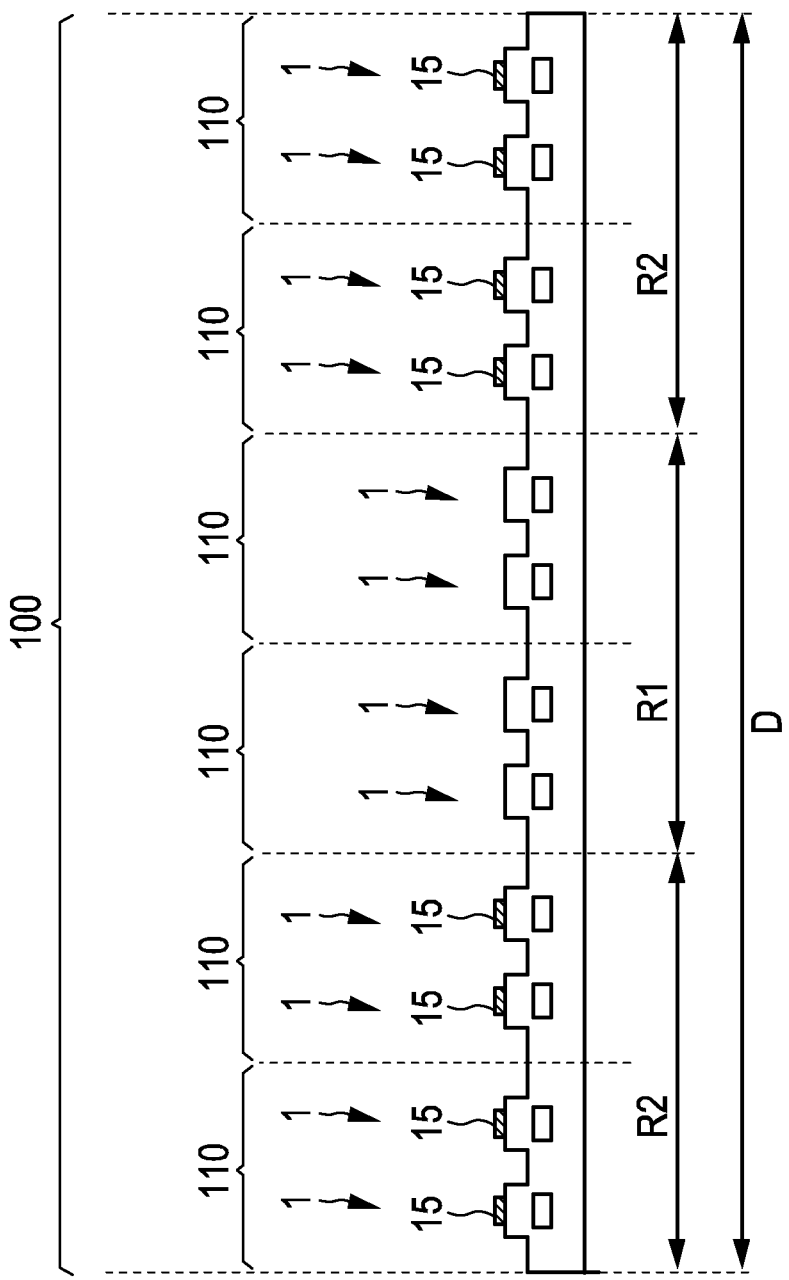
FIG. 12 shows a schematic cross section of a wafer according to a fifth embodiment.

FIG. 11 shows a schematic cross section of a wafer according to a fourth embodiment. In this fourth embodiment of FIG. 11, each compensating plate 15 has a ring shape with an inner plate diameter di1, di2. The inner plate diameters di1, di2 vary across the diameter D of the wafer 100. The compensating plates 15 of a die in the centre of the wafer (region R1) have a first inner diameter di2 and the compensating plates of a die at the edge of the wafer (region R2) have a second inner diameter di2, wherein the first inner diameter di1 is bigger than the second inner diameter di2. Thus, when varying the inner plate diameter, the effect of compensation is increased.

In each of the embodiments of FIGS. 7 to 11 all of the dies 110 of the wafer 100 comprise compensating plates 15. However, it will be understood that also only a part of the dies 110 may comprise compensating plates, while the other dies may not comprise any compensating plate. This is for example shown in FIG. 12 which shows a schematic cross section of a wafer 100 according to a fifth embodiment. In this embodiment of FIG. 12, part of the dies 110 of the wafer 100 do not comprise a compensating plate 15. The dies in the centre of the wafer (region R1) have no compensating plates and the dies at the edge of the wafer (region R2) have a compensating plate 15. Also in this embodiment the configurations of the compensating plates vary across the diameter D of the wafer, namely from a configuration of having no compensating plate to a configuration of having a compensating plate 15.

In each of the embodiments of FIG. 7 to FIG. 12, the configurations of the compensating plates vary stepwise from a first region R1 of the wafer 100 to a second region R2 of the wafer 100, wherein the first region is in the centre of the wafer and the second region is at the edge of the wafer. In each of the embodiments of FIG. 7 to FIG. 12, the first region R1 and second region R2 each comprises multiple dies 110. It will be understood that each region R1, R2 can also comprise only one die or any suitable number of dies. Further, it will be understood that also more than two regions can be provided as will be explained with reference to FIG. 13.

Figure 13:
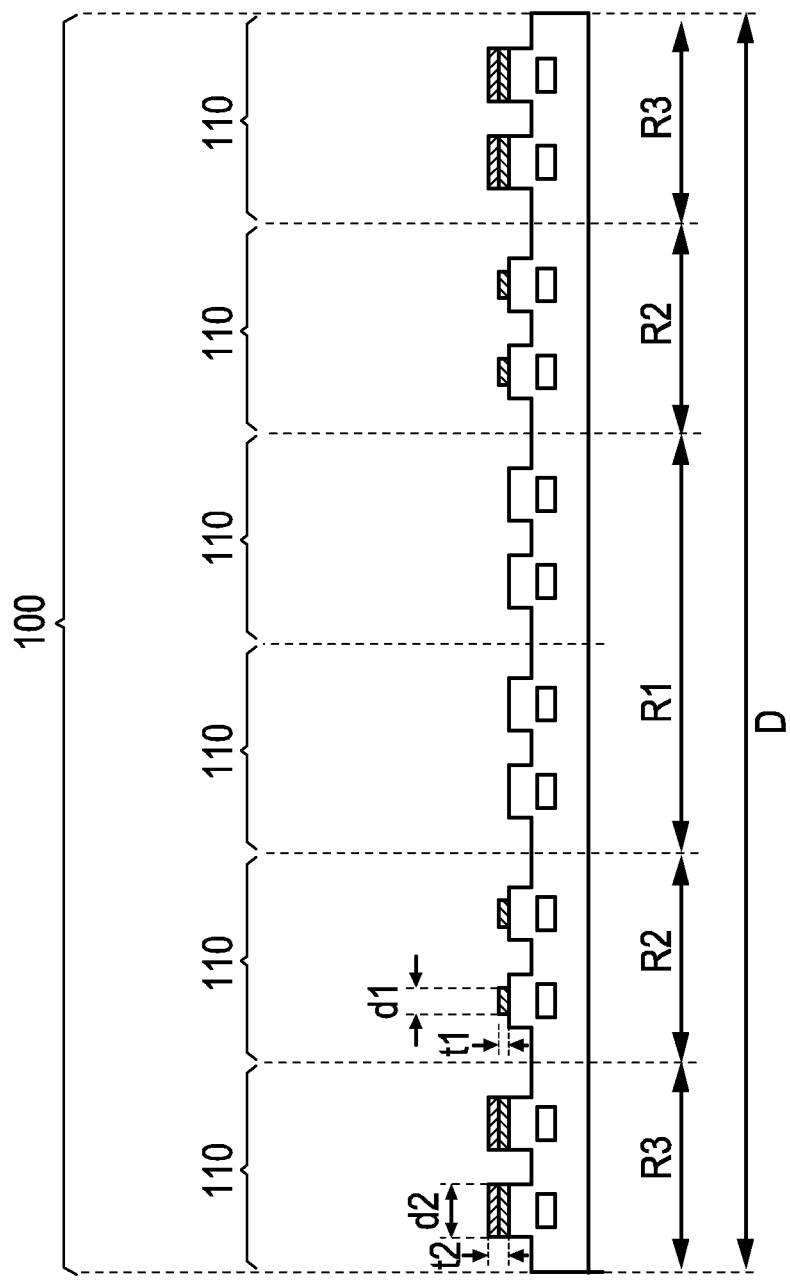
FIG. 13 shows a schematic cross section of a wafer according to a sixth embodiment.

FIG. 13 shows a schematic cross section of a wafer 100 according to a sixth embodiment. In this embodiment of FIG. 13, the configurations of the compensating plates 15 vary stepwise from the first region R1 to the second region R2 as well as from the second region R2 to a third region R3. Here, the first region R1 is in the centre of the wafer, the second region R2 is in the middle of the wafer, and the third region R3 is at the edge of the wafer. Three or less regions may be sufficient to provide for a sufficient compensation. However, in general, any suitable number of regions can be provided.

For each of FIG. 8 to FIG. 13 a specific variation pattern in membrane bows is assumed. This has for example been explained with reference to FIG. 6, where the membrane bow (e.g. determined by measuring the collapse voltage) increases almost symmetrically from the centre to the edge of the wafer. It will be understood that these examples are only for illustration purposes and that any suitable variation in configuration depending on the specific case or application can easily be deducted there from. In particular, when the variation pattern or distribution of the membrane bows across the wafer is known, the configurations of the compensating plates can then be varied according to this known variation pattern or distribution in any suitable manner.

Figure 14:
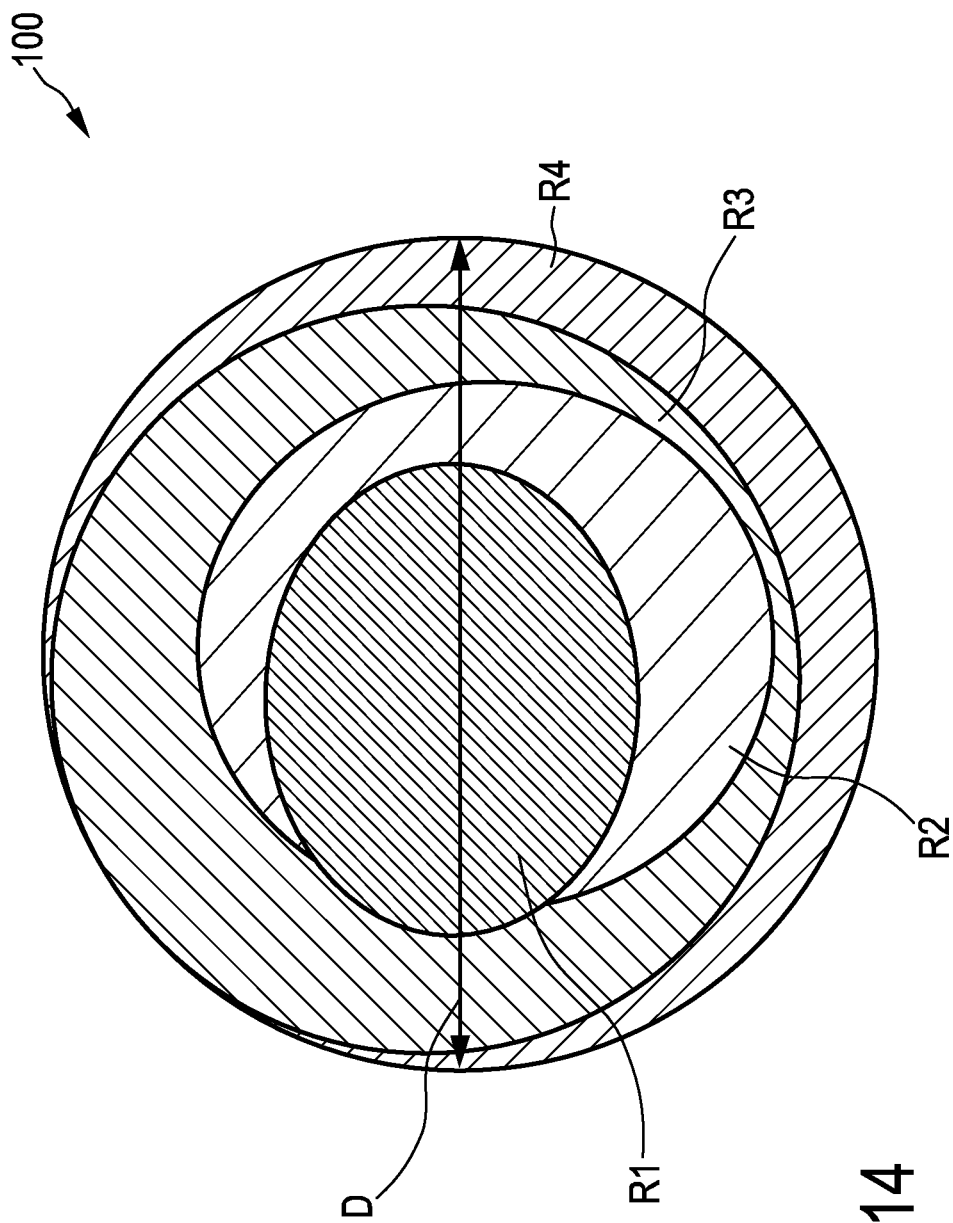
FIG. 14 shows a top view of a wafer according to a further embodiment.

FIG. 14 shows a top view of a wafer 100 according to a further embodiment. In particular, FIG. 14 shows a non-symmetrical variation of the configurations. In this embodiment of FIG. 14, the configurations of the compensating plates 15 vary stepwise across the diameter D from a first R1 to a second region R2 to a third region R3 to a fourth region R4. These regions R1, R2, R3, R4 are not circle symmetrical in this case.

In the following a specific non-limiting example will be given for a better understanding. The compensating plates in region R1 can be ring shaped, such that the membranes bend upwards to reduce downward bow. In region R2 there can be no compensating plates. The compensating plates in region R3 can be circular shaped, such that the membranes bend downwards to reduce upwards bow. The compensating plates in region R4 can also be circular shaped, but having at least two layers to increase the amount of bowing. It will be understood that this is just an arbitrary non-limiting example and that the configurations of the compensating plates depend on the given variation pattern in membrane bows, for example determined by measuring the collapse voltages.

Figure 16:
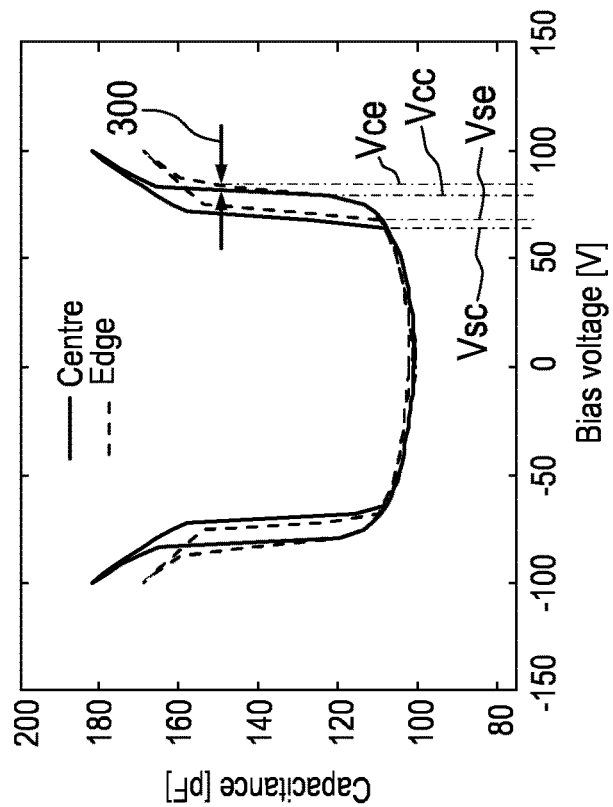
FIG. 16 shows CV curves of an edge die and a centre die with compensation.
Figure 15:
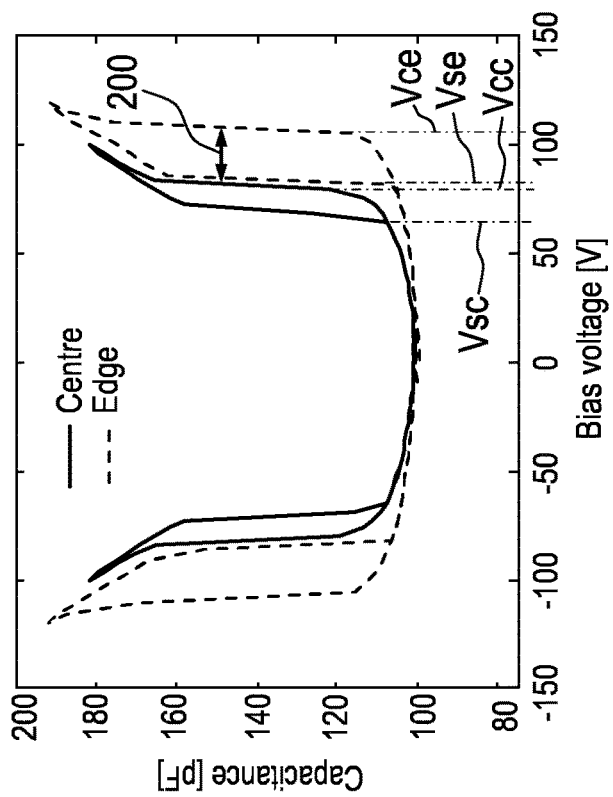
FIG. 15 shows CV curves of an edge die and of a centre die without compensation.

The effect of the compensation of the variation in membrane bows will now be explained with respect to FIG. 15 and FIG. 16. FIG. 15 shows CV curves of an edge die and of a centre die without compensation, and FIG. 16 shows CV curves of an edge die and a centre die with compensation. For the measurements of FIG. 15 no compensating plates were present on the wafer. Thus, a wafer without or before compensation was used here. For the measurements of FIG. 16, in the centre of the wafer no compensating plates were present, while at the edge of the wafer compensating plates in the form of a 200 nm thick Aluminium disk were present. These Aluminium disks had an optimally chosen size or radius, as for example explained with reference to FIG. 4a. In each of FIG. 15 and FIG. 16, the CV curve (capacitance over voltage curve) of an edge die is indicated by a dashed line and the CV curve of a centre die is indicated by a solid line. In each of FIG. 15 and FIG. 16, the collapse voltage Vc and the snapback voltage Vs is indicated. The collapse voltage of the edge die is indicated by Vce and the snapback voltage of the edge die is indicated by Vse. The collapse voltage of the centre die is indicated by Vcc and the snapback voltage of the centre die is indicated by Vsc. In FIG. 15, without compensation of the variation in membrane bows, the difference 200 between the collapse voltage Vcc of the centre die and the collapse voltage Vce of the edge die is about 25 V. In FIG. 16, with compensation of the variation in membrane bows, the difference 300 between the collapse voltage Vcc of the centre die and the collapse voltage Vce of the edge die is almost zero (0 V).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A wafer being separable into a plurality of dies, each die comprising an array of capacitive micro-machined transducer cells, each cell comprising a substrate comprising a first electrode, a membrane comprising a second electrode, and a cavity between the substrate and the membrane,
    wherein each cell of at least a part of the dies comprises a compensating plate on the membrane, each compensating plate having a configuration for influencing a bow of the membrane,
    wherein the configurations of the compensating plates vary across the wafer,
    wherein the sizes of the compensating plates vary across the wafer, and
    wherein each compensating plate has a circular shape with a plate diameter, and wherein the plate diameters vary across the wafer.

2. The wafer of claim 1, wherein the configurations of the compensating plates vary across the wafer such that the membrane bows of the cells are substantially uniform.

3. The wafer of claim 1, wherein the shapes of the compensating plates vary across the wafer.

4. The wafer of claim 1, wherein the configurations of the compensating plates of the cells within one die are substantially uniform.

5. The wafer of claim 1,
    wherein the wafer comprises a first region including a first plurality of dies and a second region including a second plurality of dies, and
    wherein the configurations of the compensating plates vary stepwise from the first region of the wafer to the second region of the wafer.

6. The wafer of claim 1,
    wherein the wafer comprises a first region including a first plurality of dies and a second region including a second plurality of dies, and
    wherein the sizes of the compensating plates vary stepwise from the first region of the wafer to the second region of the wafer.

7. The wafer of claim 6, wherein the first region is substantially in the center of the wafer and the second region is substantially at the edge of the wafer.

8. A wafer being separable into a plurality of dies, each die comprising an array of capacitive micro-machined transducer cells, each cell comprising a substrate comprising a first electrode, a membrane comprising a second electrode, and a cavity between the substrate and the membrane,
    wherein each cell of at least a part of the dies comprises a compensating plate on the membrane, each compensating plate having a configuration for influencing a bow of the membrane,
    wherein the configurations of the compensating plates vary across the wafer,
    wherein the sizes of the compensating plates vary across the wafer, and
    wherein each compensating plate has a ring shape with an inner plate diameter, and wherein the inner plate diameters vary across the wafer.

9. A wafer being separable into a plurality of dies, each die comprising an array of capacitive micro-machined transducer cells, each cell comprising a substrate comprising a first electrode, a membrane comprising a second electrode, and a cavity between the substrate and the membrane,
    wherein each cell of at least a part of the dies comprises a compensating plate on the membrane, each compensating plate having a configuration for influencing a bow of the membrane,
    wherein the configurations of the compensating plates vary across the wafer,
    wherein the thicknesses of the compensating plates vary across the wafer, and
    wherein at least part of the compensating plates comprise more layers than other compensating plates.

10. The wafer of claim 9,
    wherein the wafer comprises a first region including a first plurality of dies and a second region including a second plurality of dies, and
    wherein the thicknesses of the compensating plates vary stepwise from the first region of the wafer to the second region of the wafer.

11. The wafer of claim 10, wherein the first region is substantially in the center of the wafer and the second region is substantially at the edge of the wafer.

* * * * *